(12) United States Patent
Iijima et al.

(10) Patent No.: US 10,094,478 B2
(45) Date of Patent: Oct. 9, 2018

(54) INCOMPRESSIBLE FLUID INJECTION APPARATUS

(71) Applicants: Caterpillar SARL, Geneva (CH); Mito Kogyo Company Limited, Tokyo (JP)

(72) Inventors: Seiji Iijima, Tokyo (JP); Takayuki Naito, Tokyo (JP); Satoshi Fujita, Hyogo (JP); Ryota Suejima, Tokyo (JP)

(73) Assignee: Caterpillar SARL and Others, Geneva (CH)

( * ) Notice: Subject to any disclaimer, the term of this patent is extended or adjusted under 35 U.S.C. 154(b) by 71 days.

(21) Appl. No.: 15/424,053

(22) Filed: Feb. 3, 2017

(65) Prior Publication Data
US 2017/0219101 A1   Aug. 3, 2017

(30) Foreign Application Priority Data
Feb. 3, 2016   (JP) ................ 2016-019154

(51) Int. Cl.
| | |
|---|---|
| *B05B 1/30* | (2006.01) |
| *F16K 1/42* | (2006.01) |
| *B05B 9/01* | (2006.01) |
| *F15B 13/02* | (2006.01) |
| *F16K 15/04* | (2006.01) |
| *B62D 55/30* | (2006.01) |

(52) U.S. Cl.
CPC .............. *F16K 1/42* (2013.01); *B05B 1/3006* (2013.01); *B05B 9/01* (2013.01); *F15B 13/027* (2013.01); *F16K 15/044* (2013.01); *B62D 55/305* (2013.01)

(58) Field of Classification Search
CPC ........ F16K 1/42; F16K 15/044; F15B 13/027; B05B 9/01; B05B 1/3006
USPC .... 239/104, 106, 525, 530, 462, 471, 533.1, 239/570, 571, 574, 589
See application file for complete search history.

(56) References Cited

U.S. PATENT DOCUMENTS

| | | | | |
|---|---|---|---|---|
| 6,227,464 | B1 * | 5/2001 | Allmendinger | ....... B05B 1/3006 239/571 |
| 8,403,241 | B2 * | 3/2013 | Jung | ..................... B05B 7/2462 239/571 |

* cited by examiner

*Primary Examiner* — Steven J Ganey

(57) ABSTRACT

A grease injection valve 10 is provided having a valve body 16 including a flow path 15 the valve body. A foreign matter intrusion prevention valve 18 is provided at the upstream side of a check valve 17 in the flow path 15 of valve body 16. Grooves 47 are positioned around the periphery of a foreign matter intrusion prevention valve body 44 in the flow path 15 to provide communication between the downstream side and the upstream side of the foreign matter intrusion prevention valve body 44. When the check valve 17 has a functional failure, high-pressure grease escapes through the grooves 47 to bypass the foreign matter intrusion prevention valve body 44 and is discharged to an exterior of the grease injection valve 10. This can avoid excessive pressure caused by the grease backflow from being applied to the foreign matter intrusion prevention valve 18.

3 Claims, 1 Drawing Sheet

INCOMPRESSIBLE FLUID INJECTION APPARATUS

TECHNICAL FIELD

The present disclosure relates to an incompressible fluid injection apparatus including a check valve provided in the middle of a flow path of a valve body and a foreign matter intrusion prevention valve provided at the upstream side of the check valve of the flow path of the valve body.

BACKGROUND

Conventionally, an injection valve is used for a crawler tension adjustment mechanism for adjusting the tension of a crawler running apparatus of a crawler-type vehicle, for example a hydraulic shovel. The injection valve includes a valve body having a flow path through which an incompressible fluid such as grease flows to a sealed chamber in a cylinder body. During injection of this incompressible fluid, a spherical check valve that is provided in the middle of the flow path of the valve body prevents the backflow of the incompressible fluid, and a foreign matter intrusion prevention valve is provided at the upstream side of this check valve. See Japanese Unexamined Patent Application Publication No. 2010-215207 and Publication No. 2012-233538 for examples. In this configuration however, there is a concern that a failure of the check valve allows the incompressible fluid to backflow in the flow path at high pressure and damage the foreign matter intrusion prevention valve.

A configuration is illustrated is in Japanese Unexamined Patent Application Publication No. 2012-148592 in which a groove is provided at an attachment screw on the outer side of an injection valve to thereby allow fluid to escape from the downstream side. In the case of this configuration however, the pressure cannot escape unless the injection valve is first loosened.

SUMMARY

The present disclosure is directed to providing an incompressible fluid injection apparatus that can suppress, when the check valve fails to function, an excessive pressure caused by the backflow of incompressible fluid from being applied to the foreign matter intrusion prevention valve.

In one aspect, the present disclosure provides an incompressible fluid injection apparatus that includes a valve body including a flow path through which incompressible fluid flows to the discharge side during injection of the incompressible fluid. A check valve is provided in the middle of the flow path of this valve body that prevents the backflow of the incompressible fluid. The apparatus further includes a foreign matter intrusion prevention valve provided at the upstream side of the check valve in the flow path of the valve body, the intrusion prevention valve having a spring for biasing a spherical valve body to close an upstream part of the flow path, and grooves provided around the periphery of spherical valve body to provide fluid communication between the downstream side and the upstream side of this foreign matter intrusion prevention valve body.

When the check valve fails, although high-pressure incompressible fluid may backflow to the foreign matter intrusion prevention valve, the existence of the grooves providing communication between the downstream side and the upstream side of the foreign matter intrusion prevention valve body allows the high-pressure incompressible fluid to bypass the foreign matter intrusion prevention valve body and be discharged to the exterior of the apparatus. This can suppress an excessive pressure caused by the backflow of the incompressible fluid from being applied to the foreign matter intrusion prevention valve.

The grooves may be provided at substantially-equal intervals in the valve seat surrounding the spherical valve body so that the fluid can be discharged to the exterior through these grooves in a secure and substantially-uniform manner.

DETAILED DESCRIPTION

Figure 1A:
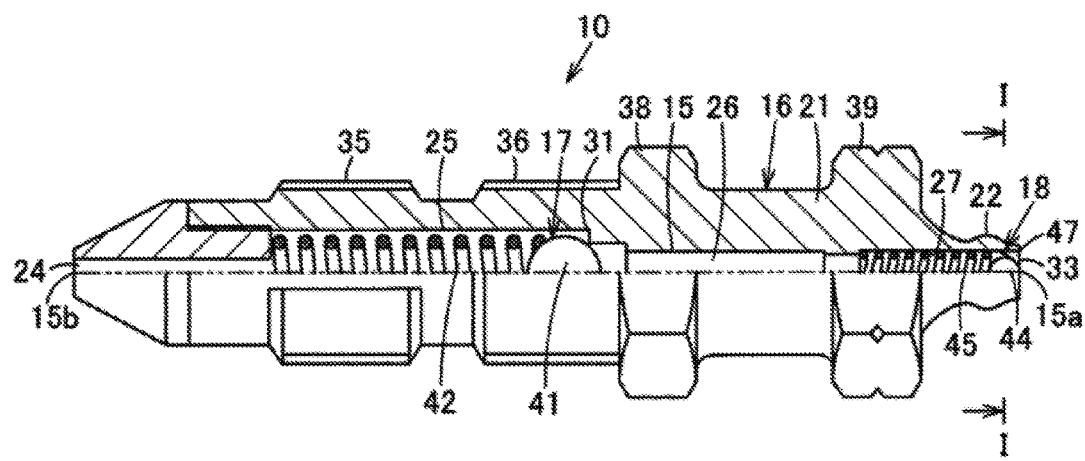
FIG. 1A illustrates one embodiment of an incompressible fluid injection apparatus according to the present disclosure and the upper half section is a cross-sectional view while the lower half section is a side view of the exterior.

In FIG. 1A, the reference numeral 10 denotes a grease injection valve functioning as an incompressible fluid injection apparatus (hereinafter simply referred to as an injection valve). This injection valve 10 is used, for example, for a crawler tension adjustment apparatus that adjusts the crawler tension of a pair of left and right crawler running apparatuses of a base carrier of a hydraulic shovel.

The crawler tension adjustment apparatus includes an adjuster cylinder. The crawler tension adjustment apparatus is a known one in which the grease inclusion amount is changed via an injection valve 10 into a sealed chamber of this adjuster cylinder to thereby change the protrusion amount of the piston rod of the adjuster cylinder so that an idle wheel is moved to increase or decrease the crawler tension.

The injection valve 10 includes a valve body 16 having a flow path 15 through which grease flows to the sealed chamber side of the adjuster cylinder during the injection of the grease, a check valve 17 provided in the middle of the flow path 15, and a foreign matter intrusion prevention valve 18 that is provided in the flow path 15 at the upstream side of the check valve 17.

The valve body 16 has a body section 21 screwed into the adjuster cylinder and a grease nipple section 22 functioning as a grease supply section at the upstream end of the body section 21 and positioned outside of the adjuster cylinder. This valve body 16 includes therein a through hole 24 constituting the flow path 15 and the through hole 24 is formed to penetrate both end faces. Specifically, the upstream-side opening of this through hole 24 is an upstream-side opening 15a of the flow path 15. The downstream-side opening of the through hole 24 is a downstream-side opening 15b of the flow path 15. This through hole 24 has, moving from the downstream side of the flow path 15 to the upstream side, a check valve hole part 25, a communication passage 26, and a foreign matter intrusion prevention valve hole part 27. The check valve hole part 25 has the check valve 17 that is abutted to a valve seat 31 positioned at an upstream end of this check valve hole part 25 when in a closed state and that is moved, during the grease injection, away from the valve seat 31 into an open state. The communication passage 26 is formed to have a smaller diameter than that of the check valve hole part 25 and allows the check valve hole part 25 to communicate with the foreign matter intrusion prevention valve hole part 27. The foreign matter intrusion prevention valve hole part 27 includes the foreign matter intrusion prevention valve 18 that is abutted to a valve seat 33 positioned at an upstream end of this foreign matter intrusion prevention valve hole part 27 in a closed state and that is moved, during the grease injection, away from the valve seat 33 to be in an open state. In this embodiment, this valve seat 33 is positioned at an edge of the upstream-side opening 15a.

The outer periphery face of the body section 21 of the valve body 16 has threads 35 and 36 and also includes nut sections 38 and 39 provided in an integrated manner. The nut section 39 is provided to be adjacent to the grease nipple section 22. The grease nipple section 22 is a part that is connected, during the grease injection, to a tip end of an injection piping having a base end connected to an injection pump (not shown).

The check valve 17 operates to allow grease to flow therethrough downstream while in an open condition and to regulate the grease flow upstream while in a closed state so that the grease backflow is prevented. This check valve 17 includes a check valve body 41 spherically formed of steel for example, and a compression coil spring 42 functioning as a check valve biasing member for biasing this check valve body 41 to the valve seat 31.

The check valve body 41 is positioned at the upstream end of the check valve hole part 25 and is opposed to the valve seat 31. The compression coil spring 42 is positioned at the downstream side of the check valve body 41 and is supported by the downstream end of the check valve hole part 25.

The foreign matter intrusion prevention valve 18 operates to allow grease to flow therethrough while in an open state and to regulate the grease flow upstream while in a closed state to prevent grease backflow and to thereby also prevent the intrusion of foreign matter into to the flow path The term "foreign matter" means contamination of minute dirt or iron powders for example. This foreign matter intrusion prevention valve 18 includes a foreign matter intrusion prevention valve body 44 spherically formed by steel for example and a compression coil spring 45 that functions as a foreign matter intrusion prevention valve biasing member for biasing this foreign matter intrusion prevention valve body 44 to the valve seat 33.

Figure 1B:
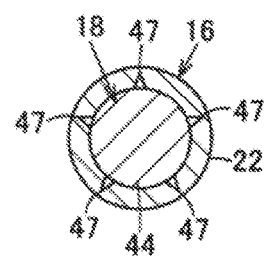
FIG. 1B is a cross-sectional view taken along the line I-I of FIG. 1A.

The foreign matter intrusion prevention valve body 44 is positioned at the upstream end of the foreign matter intrusion prevention valve hole part 27 and is opposed to the valve seat 33. The valve body 16 at the periphery of this foreign matter intrusion prevention valve body 44 (the flow path 15) includes at least one groove 47. This groove 47 is provided to penetrate the valve seat 33 from the downstream side to the upstream side. Specifically, this groove 47 is provided to communicate with the upstream end of the flow path 15 (the upstream-side opening 15a). As shown in FIG. 1B, a plurality of grooves 47 are preferably provided in the valve seat 33 to surround the foreign matter intrusion prevention valve body 44 at substantially-equal intervals. The respective grooves 47 are slits that are radially provided in the valve seat adjacent an outer circumference of the foreign matter intrusion prevention valve body 44 along the diameter direction, that have a substantially-triangular cross section having a narrower width in a direction away from the foreign matter intrusion prevention valve body 44, and that have a depth in the diameter direction for example of about 0.2-0.3 mm to about 1 mm and an axial length of about 10 mm.

Returning to FIG. 1A, the compression coil spring 45 is positioned at the downstream side of the foreign matter intrusion prevention valve body 44 and is supported by the downstream end of the foreign matter intrusion prevention valve hole part 27. This compression coil spring 45 has a biasing force set to be lower than the biasing force of the compression coil spring 42 of the check valve 17. Thus, the foreign matter intrusion prevention valve 18 has a pressure resistance set to be lower than the pressure resistance of the check valve 17.

INDUSTRIAL APPLICABILITY

In order to reduce the crawler tension, a desired amount of grease is discharged from a discharge valve (not shown) to the exterior of the sealed chamber of the adjuster cylinder to compress the adjuster cylinder and allow idle wheel to move in a rear direction toward the drive wheel.

In order to increase the crawler tension on the other hand, the tip end of the injection piping is connected to the grease nipple section 22 of the injection valve 10 and then the injection pump is allowed to operate. As a result, a desired amount of grease is injected through the injection valve 10 into the sealed chamber of the adjuster cylinder to extend the adjuster cylinder and the idle wheel is caused to move in a forward direction away from the drive wheel.

The crawler tension adjustment apparatus including the injection valve 10 as described above is configured so that the foreign matter intrusion prevention valve 18 provided in the flow path 15 of the valve body 16 of the injection valve 10 prevents foreign matter from intruding into the flow path 15 during operation of the crawler running apparatus. This can help suppress the occurrence of check valve 17 developing a defective valve seat and thus grease leakage and consequent loss of crawler tension, thus stabilizing the traveling performance by the crawler running apparatus.

When a malfunction of the compression coil spring 42 of the check valve 17 or a damaged valve seat causes a functional failure of the check valve, high-pressure grease may backflow to the foreign matter intrusion prevention valve hole part 27 from the check valve hole part 25 via the communication hole part 26. In this case, the valve seat 33 provided at the upstream end of the foreign matter intrusion prevention valve hole part 27 of the flow path 15 includes the grooves 47 providing the communication between the downstream side of the foreign matter intrusion prevention valve body 44 and the upstream side. Thus, the high-pressure grease is sent through grooves 47 to bypass the foreign matter intrusion prevention valve body 44 and is discharged to the exterior of the injection valve 10. This can suppress an excessive pressure due to the grease backflow from being applied to the foreign matter intrusion prevention valve 18 and subsequent failure of valve 18, which failure might allow foreign matter to enter inject valve 10 and cause further damage to the crawler tension adjustment apparatus.

Furthermore, the existence of a plurality of grooves 47 provided to surround the foreign matter intrusion prevention valve body 44 at substantially-equal intervals can allow the high-pressure grease to be discharged through these grooves 47 in a secure and substantially-uniform manner.

In particular, the foreign matter intrusion prevention valve 18 has a pressure resistance set to be lower than the pressure resistance of the check valve 17. Thus, although a case may be assumed where the foreign matter intrusion prevention valve 18 cannot sustain the pressure of backflowing grease caused by the failure of the check valve 17, the grooves 47 can be used to discharge the high-pressure grease to the exterior. This can avoid excessive pressure during the functional failure of the check valve 17 from being applied to the foreign matter intrusion prevention valve 18 and potentially causing it to also fail, thereby maintaining the functional capability of the foreign matter intrusion prevention valve 18.

In addition, the groove 47 is formed as a slit having a small opening area, thereby preventing foreign matter from entering the flow path through a groove 47 to bypass the foreign matter intrusion prevention valve 18.

In the above embodiment, the crawler tension adjustment apparatus can be applied not only to a crawler running apparatus for a hydraulic shovel but also to crawler running apparatuses for other construction machines such as a bulldozer or even other grease injection valve applications.

What is claimed is:

1. An incompressible fluid injection apparatus, comprising:
 a valve body including a flow path through which an incompressible fluid flows to a discharge side of the valve body during injection of the incompressible fluid;
 a check valve provided in a middle of the flow path of the valve body and configured to prevent backflow of the incompressible fluid;
 a foreign matter intrusion prevention valve provided at an upstream side of the check valve in the flow path of the valve body, including a spring for biasing a spherical foreign matter intrusion prevention valve body configured for opening or closing a part of the flow path; and
 a plurality of grooves provided around a periphery of the foreign matter intrusion prevention valve body in the flow path.

2. The incompressible fluid injection apparatus according to claim 1, characterized in that the grooves are provided in a valve seat at substantially-equal intervals surrounding the foreign matter intrusion prevention valve body, and said grooves are configured to provide fluid communication between a downstream side and a upstream side of the foreign matter intrusion prevention valve body even when the foreign matter intrusion prevention valve body is in a position closing a part of the flow path.

3. The incompressible fluid injection apparatus according to claim 1, characterized in that the foreign matter intrusion prevention valve has a pressure resistance set to be lower than the pressure resistance of the check valve.

\* \* \* \* \*